Aug. 29, 1939.  E. S. CORNELL, JR  2,170,853
METHOD OF MAKING PIPE FITTINGS
Filed Oct. 9, 1937   3 Sheets-Sheet 1
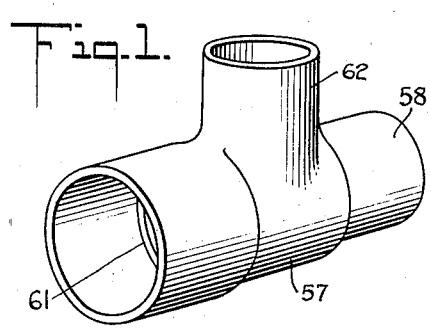
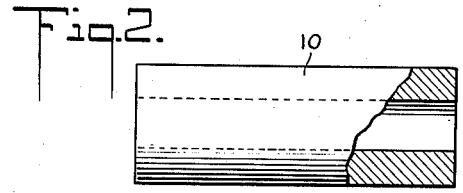
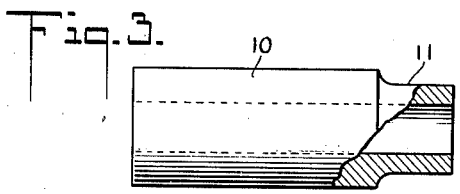
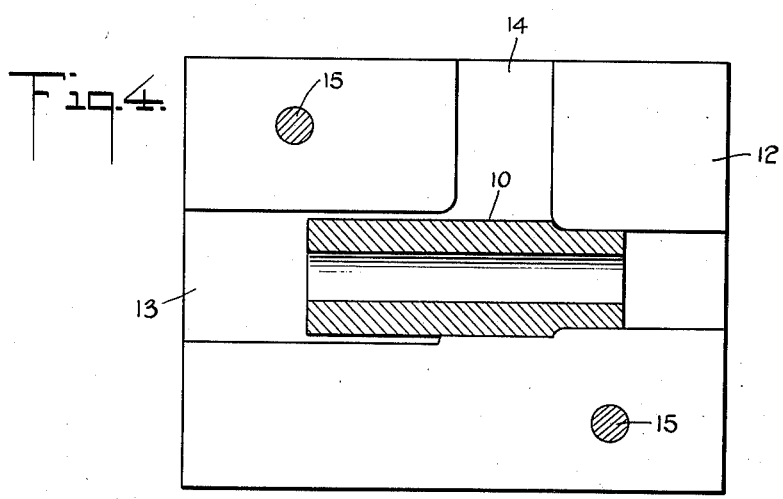
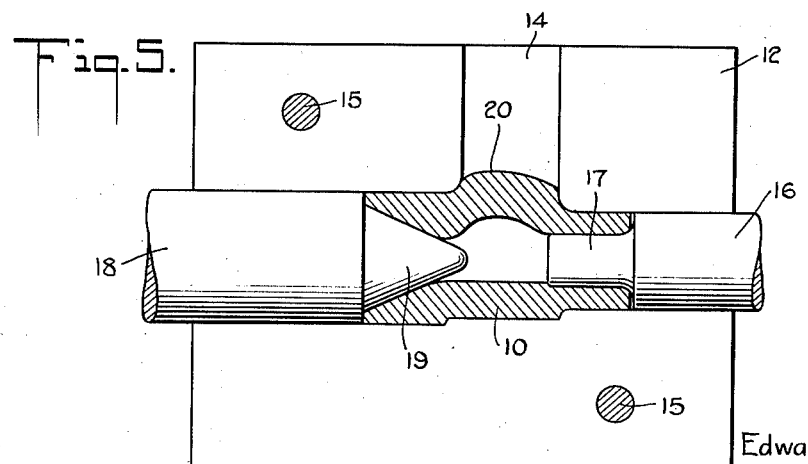
INVENTOR
Edward S. Cornell, Jr.
BY
HIS ATTORNEY Aug. 29, 1939.  E. S. CORNELL, JR  2,170,853
METHOD OF MAKING PIPE FITTINGS
Filed Oct. 9, 1937  3 Sheets-Sheet 2
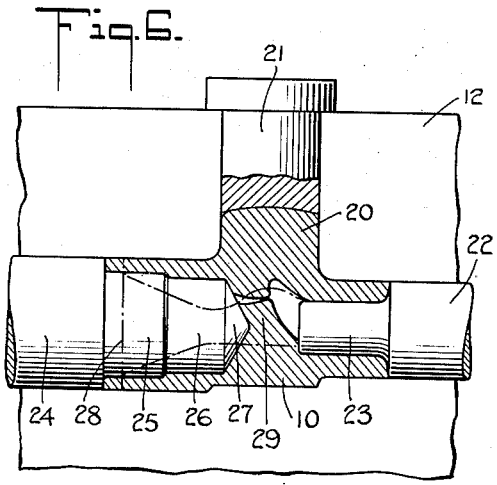
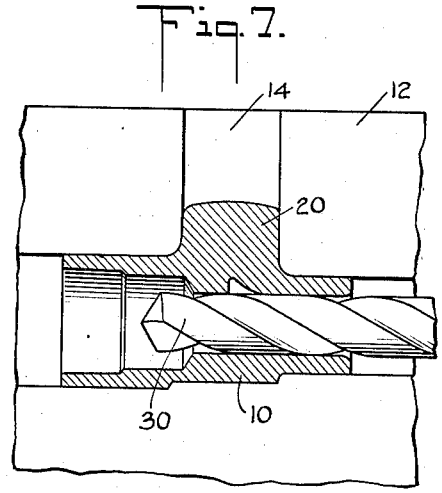
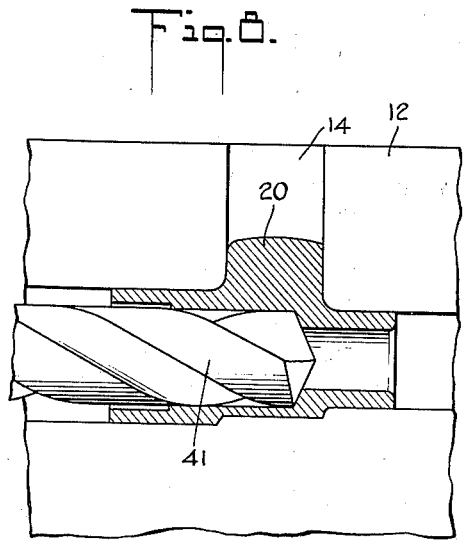
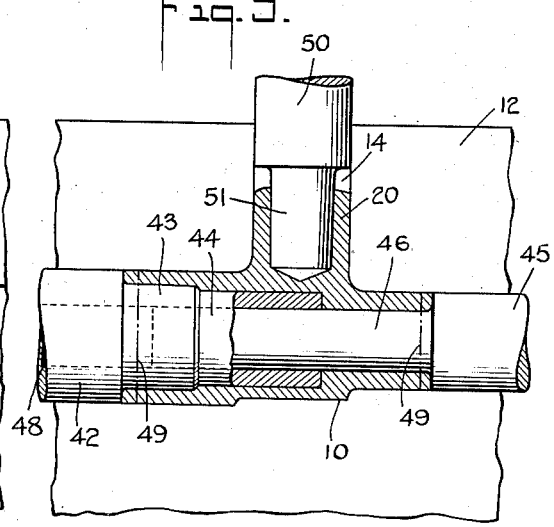
INVENTOR
Edward S. Cornell, Jr.
BY
HIS ATTORNEY Aug. 29, 1939.  E. S. CORNELL, JR  2,170,853
METHOD OF MAKING PIPE FITTINGS
Filed Oct. 9, 1937  3 Sheets-Sheet 3

INVENTOR
Edward S. Cornell, Jr.
BY
HIS ATTORNEY

Patented Aug. 29, 1939

2,170,853

UNITED STATES PATENT OFFICE 2,170,853

METHOD OF MAKING PIPE FITTINGS

Edward S. Cornell, Jr., Larchmont, N. Y., assignor, by mesne assignments, to American Radiator & Standard Sanitary Corporation, New York, N. Y., a corporation of Delaware Application October 9, 1937, Serial No. 168,166

7 Claims. (Cl. 29—157)

My invention relates to pipe fittings formed ot integral metal wrought to final status by cold operation, and more particularly to an improved method of making pipe fittings and the resulting product.

My present application is a continuation in part of my copending application Serial No. 2,574, filed January 19, 1935, and entitled Integral wrought pipe fittings.

The type of pipe fittings to which my invention particularly applies comprises a body having a longitudinal passage therethrough, and outlet portions for such body arranged to be telescopically connected to an end of a pipe or other pipe fitting and with one of said outlet portions having a diameter exceeding the diameter of the other outlet, and said pipe fitting having a lateral outlet or neck member, the passage of which communicates with the longitudinal passage of the body.

Suitable provision, such as a shoulder, bead or the like, is preferably formed in the pipe fitting, for gauging the scope of the telescopic connection with the pipe fitting with the end of the pipe or other pipe fitting. My invention finds a special application to pipe fittings connected by sweat telescopic joint with the ends of piping or other pipe fitting, in which circumstance each body and lateral opening is provided with a smooth face of substantially uniform diameter, and dimensioned relative to the end of a pipe or pipe fitting to provide a clearance of suitable magnitude to effect capillary or surface flow of the bonding medium when applied in heated status, the shoulder, bead or other stopping being located to afford a proper area of the resulting connection, to insure a joint of sufficient strength against mechanical or other stresses encountered in use.

Preferred embodiments of my invention, as made according to my improved method are preferably of copper or of copper alloys of predominant copper content, and wrought to final status by cold pressure working such as drawing, forming, swaging, and including drilling and the like, thereby obviating the necessity for the use of elevated temperatures which give rise to the formation of oxides or other deleterients.

While my improved method is of utility in the manufacture of pipe fittings of the above stated character, it is equally of utility in the manufacture of pipe fittings having a wall thickness capable of bearing threads of a range of magnitude including that comparable to so-called iron pipe threads.

In the accompanying drawings, illustrating an embodiment of my invention as made according to my improved method and illustrating the various steps involved in practicing such method, Fig. 1 is a perspective view of a pipe fitting.

Fig. 2 is an elevation, partly in section, of a billet or blank utilized in practicing my improved method.

Fig. 3 is an elevation, partly in section, and illustrating the condition of the blank shown in Fig. 2, after the first step in my improved method, Fig. 4 is a plan view of one section of a die block, showing the blank or billet illustrated in Fig. 3 in position therein preparatory to carrying out the second step of my improved method.

Fig. 5 is a view similar to Fig. 4, showing the condition of the blank illustrated in Figs. 3 and 4 after the second step of my improved method and illustrating in elevation the tools utilized in carrying out such step.

Fig. 6 is a plan view of a portion of a die block similar to the die block shown in Figs. 4 and 5 and illustrating the third step of my improved method, and the tools employed in carrying out such step.

Fig. 7 is a view similar to Fig. 6, but showing the steps employed in carrying out the third step removed and the tool utilized for carrying out the fourth step of my improved method in position therein.

Fig. 8 is a view similar to Fig. 7, and illustrating the carrying out of the fifth step of my improved method.

Fig. 9 is a view similar to Fig. 8, and illustrates the sixth step of my improved method.

Figure 10:
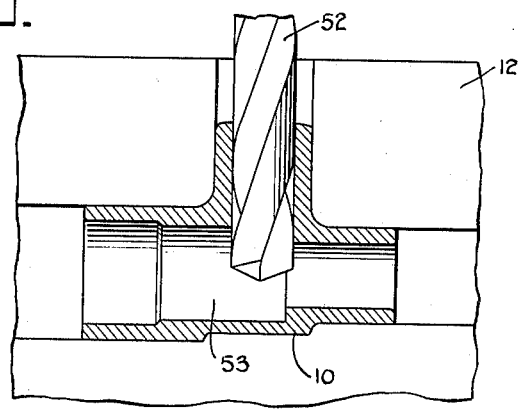
Fig. 10 is a view similar to Fig. 9, and illustrates the seventh step of my improved method and the tool employed for carrying out the same.

I preferably utilize a tubular blank as illustrated in Fig. 2 and designated by the reference numeral 10, such blank having a cubical content substantially equal to the cubical content of the finished fitting desired, plus additional metal equal to the amount necessarily removed from the fitting in the preferred cutting, drilling and reaming operations. As a first step in my improved method I reduce, as by cutting or turning, one end of the blank 10 to a suitable external diameter, as indicated by the reference character 11, so as to correctly position such blank in a die block 12.

The die block 12 is preferably a two-part die block, but one of which elements being shown in Fig. 4 and in succeeding figures. The die block has a longitudinal passage 13 therethrough, and a lateral 14 formed therein and extending outwardly from but communicating with such longitudinal passage 13. Bolts 15 are utilized for the purpose of maintaining the elements of the die block 12 in operative relation to each other and to enclose the blank 10.

The die block 12 with the blank 10 therein, as shown in Fig. 4 is placed in a press, preferably of the hydraulic type, and a plunger 16 inserted, said plunger having its body portion in close sliding fit in the end of the longitudinal passage 13 adjacent the reduced end 11 of the blank 10, and having a reduced diameter end 17. Such reduced end 17 is slightly larger than the internal diameter of the tubular blank 10. Also, there is employed a plunger 18, the body portion of which is a close sliding fit in the other end of the longitudinal passage 13 in the die block 12. Such plunger 18 is provided with preferably a conical end 19 adapted to engage in and expand the hole in the tubular blank 10.

The plungers 16 and 18 are moved inwardly toward each other, as illustrated in Fig. 5, thereby compressing the blank 10 and shortening the same considerably as regards length, and causing a cold flow of the metal laterally at one side thereof, into the lateral passage 14 of the die block, as indicated by the reference numeral 20.

It will be noted on an inspection of Fig. 5 that at the completion of the second step of my improved method, the right hand end of the blank 10 is not yet in full engagement with the body portion of the plunger 16, and, therefore, this end of the blank 10 has not yet attained its final status.

The plungers 16 and 18 are then withdrawn from the die block 12 and either the plungers to be utilized for carrying out the next or third operation are placed in the press or the die block 12 is transferred to another press, also preferably of the hydraulic type, and which press carries the necessary plungers and tools for performing the third operation of my improved method.

Such step is illustrated in Fig. 6, where it will be noted that in the lateral passage 14 of the die block 12 there is placed a block or stop 21, and in the passage 13 of the die are employed a plunger 22 having a reduced end 23, and an opposingly directed plunger 24 having zones of reduced diameter and designated by the reference characters 25 and 26 respectively. The reduced zone 26 preferably has formed at its end a cone shaped portion 27.

In carrying out this third step of my improved method the plunger 22 is forced into the position shown in Fig. 6, which is its final position, before the plunger 24 is brought into operative relation with the blank 10. This preliminary operation of the plunger 22 brings to substantially final status the right hand end of the blank 10 whereupon the plunger 24 is moved into the position shown in Fig. 6, thereby causing a cold flow of the metal of the blank 10 and further extending the laterally extruded portion 20.

The block 21 limits the outward movement of such lateral portion 20. Because of the limited flow of the metal of the blank 10 into the lateral 14, the movement of the plunger forces the metal to flow axially of said plunger. There is shown in Fig. 6 a dot and dash line indicated by the numeral 28, which illustrates the original position of the left hand end of the blank 10, or the position in which such end was left after the completion of the second step as illustrated in Fig. 5. It will be noted therefore that the extension to the larger opening of the pipe fitting being produced is elongated by having metal flowed into the space between the reduced diameter zones 25 and 26 of the plunger 24 and the longitudinal passage 13 of the die block 12.

After the step of the improved process as just described, there will be a mass of metal 29 within the interior of the body of the now incomplete fitting and in the passage extending through the pipe fitting. To remove this mass of metal the billet or blank 10 may be left in the die block 12 and a drill 30 utilized to remove the same from the blank, as clearly shown in Fig. 7. This preliminary drilling places the blank 10 in condition to be operated upon by a drill 41, as shown in Fig. 8, where it will be noted that the drill 41 is of substantially the same diameter as the reduced zone 26 of the plunger 24 shown in Fig. 6. The drill 41 preferably is advanced far enough into the body of the material of the blank 10 to extend beyond the medial portion of axis of the lateral 20, and also provide a structure for receiving a supporting and finishing means for subsequent steps in the completion of the fitting.

After the step of the method, as illustrated in Fig. 8 and above described, is completed, the drill 41 is removed from the blank 10 and a hollow plunger 42 inserted in one end of the die block 12 and the reduced portion 43 and 44 of such plunger are brought into engagement with the corresponding zones formed in the blank 10 by the reduced zone 25 of the plunger 24 as shown in Fig. 6 and by the drill 41 as shown in Fig. 8. Extending into the die block 12 from the opposite end thereof is a plunger 45 which has a reduced portion 46 of a diameter substantially equal to the diameter of the hole made by the drill 30 as shown in Fig. 7 and substantially equal to the diameter of the hole 48 of the plunger 42, as shown in Fig. 9. The reduced portion 46 of the plunger 45 is of suitable length to telescope into the bore 48 of the plunger 42, the extent of such telescoped insert positioning the end of the portion 46 at a point substantially beyond the central portion of the blank 10. In Fig. 9 are shown dot and dash lines 49, the distance between such lines measuring or denoting the overall dimension of the longitudinal portion of the blank 10 before the completion of the step of the method now under consideration.

With the plungers 42 and 45 positioned as shown in Fig. 9 a plunger 50 is forced in direction toward the blank 10 into the lateral passage 14 of the die block 12 and the reduced end 51 of such plunger engaging with the partially formed lateral 20 enters the same and causes a cold flow of the metal of the blank 10 upwardly with regard to the lateral passage 14 and outwardly with regard to the longitudinal passage 13. The blank now assumes the form shown in Fig. 9, that is with the lateral portion 20 hollow and elongated to an extent slightly exceeding its ultimate length and with the longitudinal branches extending outwardly beyond the dot and dash lines 49 and in engagement with the main portions of the plunger 45 and 42 respectively.

After the plungers 50, 45 and 42 have been removed from engagement with the blank 10 a drill 52 cuts out the metal wall separating the hollow in the lateral portion 20 from the cavity 53 in the blank 10, as shown in Fig. 10.

Figure 11:
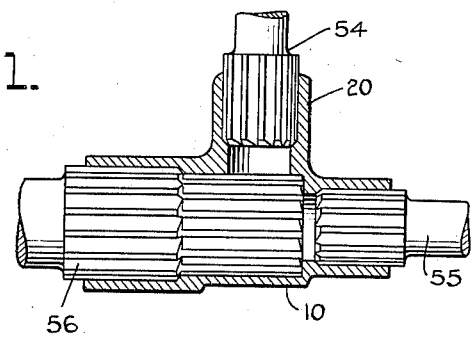
Fig. 11 is a view in cross-sectional elevation of a pipe fitting of my present invention and illustrating the carrying out of the eighth step of my improved method.
Figure 12:
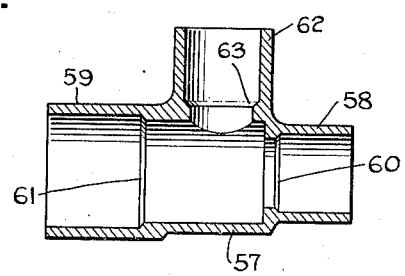
Fig. 12 is a view in cross-sectional elevation of a completed fitting made according to my present invention.

The blank 10 now assumes the form shown in Fig. 11 and in order to provide for the last and finishing operation the lateral portion 20 is squared off on the end and a reamer 54 is employed to enlarge and ream out the hole made by the plunger 50 and drill 52 to produce the finished lateral shown in Fig. 12. Also, the reamer 55 is employed to perform an identical operation on the right-hand end of the blank 10. Further a similar operation is performed on the opposite end of the blank 10 by a compound reamer 56. The reamers 54, 55 and 56 may perform the respective operations simultaneously or successively as desired.

The resultant article is an improved pipe fitting, in the present instance a pipe fitting having a body portion 57 and longitudinal extension or ends 58 and 59, such extensions being in alignment with each other and arranged at opposite ends of the body 57. Also in the present instance the end 58 is of a reduced diameter as compared with the end 59, and the internal diameter of the ends 58 and 59 are relatively smooth and bear such a relation to the external diameter of a pipe or pipe fitting as to afford a sweat fitting joint between such ends and a pipe or pipe fitting. Further the fitting made according to the present improved method has in the ends 58 and 59 stops 60 and 61 respectively which limit the inward movement of the end of a pipe fitting and thus insure that there will be a sufficient area of the present fitting and a pipe or pipe fitting for a practical joint. Also, the interior diameter of the finished lateral 62 is relatively smooth and at its interior, or adjacent the portion joining the body 57 of the pipe fitting, is a shoulder or ridge 63, which will limit the inward movement of a pipe or pipe fitting with which the present fitting is adapted to be associated. Further, the area of the internal surface of the lateral 62 is sufficient to provide for an amply strong joint between such lateral and pipe or pipe fitting, and the internal diameter of the lateral 62 bears such relation to the external diameter of a pipe or pipe fitting as to provide for a sweat joint connection between the two.

There results from my improved method a pipe fitting 57, wrought from a single block of metal, preferably of copper or of predominant copper content, and wrought to final status by a series of operations by the use of tools which perform the operations of swaging, punching, drilling and the like, and in which the metal is compressed and strengthened, and thus approaches in characteristics the piping with which it is adapted to be associated.

Whereas I have described my invention by reference to specific forms thereof, it will be understood that many changes and modifications may be made without departing from the spirit of the invention.

I claim:

1. That improved method of forming a pipe fitting which comprises utilizing a tubular blank having a cubical content in excess of the cubical content of the finished fitting desired; reducing one end of said blank by cutting excess metal therefrom; placing the blank in a die and positioning the same in the die by means of the cutaway portion; subjecting the blank to a preliminary operation to force a portion of the metal by cold flow laterally of the blank; forming a relatively enlarged opening in one end of the longitudinal portion of the blank under pressure, while simultaneously extending the length of the lateral, maintaining the longitudinal passage thus formed, while preliminarily forming a passage in the lateral completing the passage in the lateral, and then reaming the openings to size.

2. That improved method of forming a pipe fitting which comprises reducing one end of a tubular blank by removing metal therefrom, placing the blank in a die and positioning the same therein by said reduced end portion, subjecting the blank to the action of a conical punch to form an enlarged opening at one end and a cold flow of the metal of the blank laterally outward intermediate the ends thereof while maintaining the bore of the tubular blank and the reduced end substantially constant, subjecting the blank to a pressure operation by a plunger at the end remote from the reduced end to reduce the thickness of the walls of such end and elongate the same while simultaneously causing the flow of metal at the first formed lateral to extend the lateral to the desired point, piercing the lateral with a punch to form a hole therein, removing excess metal from the interior of the blank to connect the passage in the lateral with the longitudinal passage through the blank, and then finishing the blank.

3. That improved method of forming a pipe fitting which comprises utilizing a tubular blank, reducing one end of said blank by cutting excess metal therefrom, maintaining the bore of the tubular blank and the diameter of the reduced end substantially constant while flowing the metal of the blank laterally at a point intermediate the ends of the blank and forming an opening in alignment with the bore of the blank at the end remote from the reduced end, such opening being of increased diameter as compared with the bore of the blank, and forming a passage in the lateral communicating with the longitudinal passage.

4. That improved method of forming a pipe fitting which comprises utilizing a tubular blank having one end thereof reduced by cutting excess metal therefrom, subjecting the blank to the action of tools operated under pressure to form an enlarged opening at the end remote from the reduced end, and a lateral intermediate the ends of the blank while simultaneously maintaining the diameter of the bore and the outer diameter of the reduced end substantially constant, and forming at the ends recesses having shoulders therein for limiting the extent of movement therein of a pipe or pipe fitting.

5. The method of forming a pipe fitting having a plurality of angularly related branches, said pipe fitting being entirely of integral metal of predominant copper content wholly cold worked to final status, which includes the steps of positioning a tubular blank of such metal in a die having a longitudinal bore intersected by a branch recess, holding one end of said blank against movement while operating on the opposite end with a plunger to cause cold metallic flow of metal into said branch recess and axially along said plunger, providing a continuous axial opening through said tubular blank, completely filling said opening with retractible plug means arranged to impart a desired configuration to interior portions of the blank, exerting endwise pressure upon the metal within said branch recess in a direction toward the blank to form an opening therein while causing upward flow of metal within said branch recess and lateral flow of metal axially of the plug means, and interconnecting the said lateral and longitudinal openings.

6. The method of forming a pipe fitting having a plurality of angularly related branches, said pipe fitting being entirely of integral metal of predominant copper content wholly cold worked to final status, which includes the steps of positioning a tubular blank of such metal in a die having a longitudinal bore intersected by a branch recess, holding one end of said blank against movement while operating on the opposite end with a plunger to cause cold metallic flow of metal into said branch recess and axially along said plunger, providing a continuous axial opening through said tubular blank, completely filling said opening with retractible mutually telescoping plug means arranged to impart a desired configuration to interior portions of the blank, exerting endwise pressure upon the metal within said branch recess to form an opening therein while causing upward flow of metal within said branch recess and lateral flow of metal axially of the plug means, and interconnecting the said lateral and longitudinal openings.

7. The method of forming a pipe fitting having a plurality of angularly related branches, said pipe fitting being entirely of integral metal of predominant copper content wholly cold worked to final status, which includes the steps of positioning a tubular blank of such metal in a die having a longitudinal bore intersected by a branch recess, holding one end of said blank against movement while operating on the opposite end with a plunger to cause cold metallic flow of metal into said branch recess and axially along said plunger, providing a continuous axial opening through said tubular blank, inserting retractible plug means within said opening to fill said opening beneath said branch recess and arranged to impart a desired configuration to the interior of the blank, exerting endwise pressure upon the metal within said branch recess in direction toward the blank to form an opening therein while causing upward flow of metal within said branch recess and lateral flow of metal axially of the plug means, and subsequently finishing the interior of said blank to interconnect the said lateral and longitudinal openings by passages of ultimately desired configuration.

EDWARD S. CORNELL, Jr.